(12) United States Patent
Stoops

(10) Patent No.: US 7,605,785 B2
(45) Date of Patent: Oct. 20, 2009

(54) BLACK LEVEL UNIFORMITY CORRECTION METHOD

(75) Inventor: James T. Stoops, Walworth, NY (US)

(73) Assignee: Eastman Kodak Company, Rochester, NY (US)

( * ) Notice: Subject to any disclaimer, the term of this patent is extended or adjusted under 35 U.S.C. 154(b) by 608 days.

(21) Appl. No.: 11/179,899

(22) Filed: Jul. 12, 2005

(65) Prior Publication Data
US 2007/0013622 A1   Jan. 18, 2007

(51) Int. Cl.
*G09G 3/34* (2006.01)
(52) U.S. Cl. .................... 345/84; 345/87; 345/690
(58) Field of Classification Search ............... 345/84, 345/87, 606, 612, 89, 589, 609, 617, 690; 382/300, 277; 348/273, 277, 663; 359/242, 359/245
See application file for complete search history.

(56) References Cited

U.S. PATENT DOCUMENTS 5,418,546 A * 5/1995 Nakagakiuchi et al. ....... 345/85
5,729,243 A * 3/1998 Cavallerano et al. .......... 345/59
7,167,602 B2 * 1/2007 Yamashita et al. .......... 382/300
2001/0015835 A1   8/2001 Aoki

FOREIGN PATENT DOCUMENTS

| EP | 1 330 131 A2 | 7/2003 |
| EP | 1 587 049 A1 | 10/2005 |
| JP | 2002-152769 | 5/2002 |
| WO | WO 2005/015533 A1 | 2/2005 |

* cited by examiner

*Primary Examiner*—Abbas I Abdulselam
(74) *Attorney, Agent, or Firm*—Nelson A. Blish

(57) ABSTRACT

A method for improving liquid crystal spatial light modulator (10) uniformity is disclosed wherein an original code value (40) is obtained for a first pixel and a conditioned code value (50) is assigned to the first pixel. The conditioned code value is determined by characterizing the luminance response of a sample pixel of the spatial light modulator and defining an interpolation zone (18) for code values bounded between a minimum luminance code value and a threshold code value (16) for the sample pixel. The threshold value corresponds to a luminance level at which there is a generally linear relationship of luminance to code values. If the original code value lies within the interpolation zone, an interpolated value is calculated as the conditioned code value. The pixel of the spatial light modulator is modulated according to the conditioned code value.

9 Claims, 11 Drawing Sheets

| | |
|---|---|
| Gray Level Correction(input level) | 0.968(input level) + 21.517 |
| Gray Level Correction(128) | 145 |
| Black Level Correction | 100 |
| Threshold | 128 |

| Original code value 40 | Conditioned code value 50 | Equations |
|---|---|---|
| 0 | 100 | Black Level Correction Value |
| 64 | 123 | Round(100 + 64*(145-100)/(128-0)) |
| 92 | 132 | Round(100 + 92*(145-100)/(128-0)) |
| 128 (Threshold) | 145 | Round(0.968(128) + 21.517) |
| 256 | 269 | Round(0.968(256) + 21.517) |
| 512 | 517 | Round(0.968(512) + 21.517) |

*FIG. 9*

| Gray Level Correction(input level) | 1.1205(input level) – 75.154 |
|---|---|
| Gray Level Correction(128) | 68 |
| Black Level Correction | 0 |
| Threshold | 128 |

| Original code value 40 | Conditioned code value 50 | Equations |
|---|---|---|
| 0 | 0 | Black Level Correction Value |
| 64 | 34 | Round(0 + 64*(68-0)/(128-0)) |
| 92 | 49 | Round(0 + 92*(68-0)/(128-0)) |
| 128 (Threshold) | 68 | Round(1.1205 (128) – 75.154) |
| 256 | 212 | Round(1.1205 (256) – 75.154) |
| 512 | 499 | Round(1.1205 (512) – 75.154) |

*FIG. 11*

BLACK LEVEL UNIFORMITY CORRECTION METHOD

FIELD OF THE INVENTION

The present invention generally relates to imaging apparatus and more particularly relates to a method for improving uniformity from an electronic display using a liquid crystal (LC) spatial light modulator.

BACKGROUND OF THE INVENTION

Thanks to continuing performance and yield improvements, increasing speeds, and higher pixel resolutions, liquid crystal (LC) spatial light modulator devices hold out considerable promise for expanded use in a range of display and projection apparatus. In spite of their growing acceptance, however, both thin-film transmissive LC display panels and miniaturized liquid crystal on silicon (LCOS) devices often exhibit luminance non-uniformity, particularly when the system is set to its darkest levels. This non-uniformity in luminance can be particularly perceptible toward the edges and corners of the display field and is often accompanied by undesirable shifts in tint and shading, particularly with an image having low luminance values. Luminance non-uniformity between display pixels also varies over the range of luminance values. That is, different non-uniformity effects such as non-monotonic response may or may not appear depending on whether a pixel is intended to be black, or within a relatively dark range, or elsewhere on the luminance scale. As yet a further complication, the relative chromaticity of pixels may vary with their luminance level. Thus, differences in luminance may adversely impact color fidelity as well.

There appear to be a number of possible causes for this luminance non-uniformity. Among sources of this performance problem are imperfections in the components of the optical path, including imperfections within the LCD itself, and thermal effects acting on the components. Because of its pervasive nature and complex combination of causes, this luminance non-uniformity problem has not yet been adequately addressed in many display apparatus designs. Instead, many display designers and vendors simply take it as a "given" that such luminance non-uniformity is to be expected with these devices.

Thus, it can be seen that there is a need for LC display apparatus with improved luminance uniformity and methods for achieving better uniformity when using liquid crystal spatial light modulators.

SUMMARY OF THE INVENTION

The present invention provides a method for improving uniformity from a liquid crystal spatial light modulator comprising,
 a) obtaining an original code value for a first pixel;
 b) assigning a conditioned code value to the first pixel according to the original code value, wherein the conditioned code value is determined by a process of:
  i) characterizing the luminance response of a sample pixel of the liquid crystal spatial light modulator;
  ii) defining an interpolation zone for code values bounded between a minimum luminance code value and a threshold code value for the sample pixel;
   wherein the threshold value corresponds to a luminance level at which, for higher code values, there is a generally linear relationship of luminance to code values;
  iii) assigning the code value that yields minimum luminance from the spatial light modulator as the conditioned code value when the original code value is at its minimum luminance value; or
   calculating an interpolated value as the conditioned code value when the original code value lies within the interpolation zone; or
   applying a corrected gray-level value as the conditioned code value when the original code value is at or above the threshold code value; and
 c) modulating the first pixel of the spatial light modulator according to the conditioned code value.

The invention and its objects and advantages will become more apparent in the detailed description of the preferred embodiment presented below.

BRIEF DESCRIPTION OF THE DRAWINGS

FIGS. 9-11 are tables giving numerical values for pixels in the graph of FIG. 7.

DETAILED DESCRIPTION OF THE INVENTION

The present description will be directed in particular to elements forming part of, or in cooperation more directly with the apparatus in accordance with the present invention. It is to be understood that elements not specifically shown or described may take various forms well known to those skilled in the art.

It is instructive to note that luminance non-uniformity can occur throughout the whole surface of the LC spatial light modulator, at any number of pixels and for every code value. Theoretically, each individual pixel could be separately characterized and provided with suitable correction offsets for luminance at each code value. In practice, however, some systematic method of more generally characterizing pixel performance over various code ranges is needed, so that suitable correction can be provided. In this spirit, the inventors have identified various non-uniformity patterns that are characteristic of both LCOS and thin-film transistor (TFT) LC display devices and have developed a method for systematically handling this type of problem over the full range of luminance values.

Figure 1:
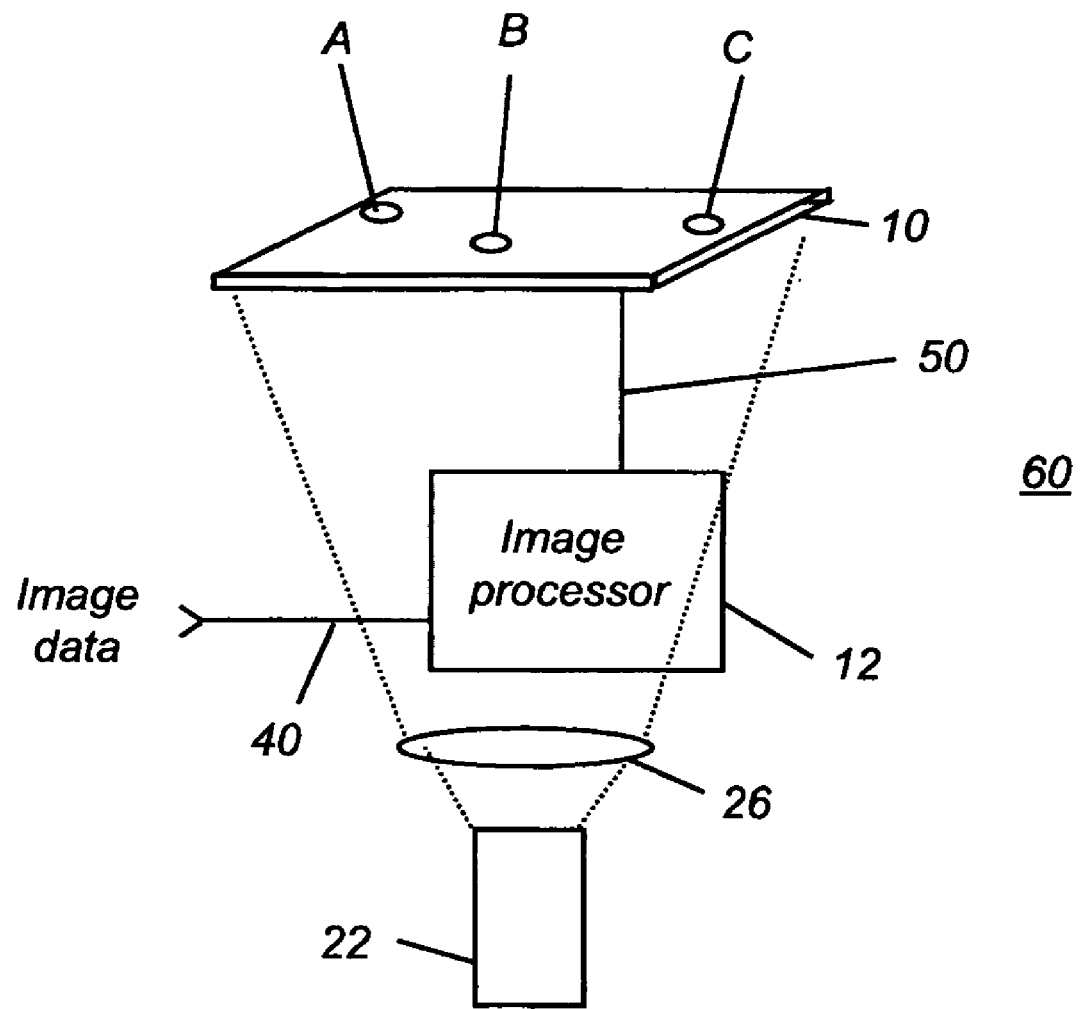
FIG. 1 is a block diagram showing an LC spatial light modulator and its control circuitry for input data.

Referring to FIG. 1, there is shown an LC spatial light modulator 10 such as might be used in a projection apparatus, backlit display, or other type of display apparatus 60. Representative sample pixels A, B, and C are indicated on the surface of LC spatial light modulator 10. Image data is provided to an image processor 12 that conditions the image data to provide appropriate code values for all of the pixels in LC spatial light modulator 10. According to these code values, LC spatial light modulator 10 then modulates light from a light source 22 to provide a display image. One or more lenses 26 or other light directing structures may be provided to enhance luminance uniformity or to provide a suitable illumination angle. The structures and data relationships shown in FIG. 1, applicable in general to uses of LC spatial light modulator 10 for both rear view and projection displays, are referenced throughout the detailed description of the invention that follows.

While it would be impractical to characterize each of the more than 1 million pixels in a typical LC spatial light modulator, there are typical behavior characteristics that apply over regions of the display. That is, pixels toward the middle of LC spatial light modulator 10 tend to exhibit the same general behavior with respect to luminance. Thus, correction provided for sample pixel B can be used for correction at neighboring pixels in the same region of LC spatial light modulator 10. Similarly, pixels in the neighborhood of sample pixels A and C can be provided with the same correction provided to these sample pixels. The relative size of various regions of LC spatial light modulator 10 and the selection of sample pixels to be characterized is determined empirically and is likely to change from one LC spatial light modulator 10 or apparatus using LC spatial light modulator 10 to the next.

A set of original code values 40, ranging in data value from 0 to some maximum value n, provided as input image data to image processor 12 in FIG. 1, determines the relative luminance level of each pixel on LC spatial light modulator 10. Image processor 12 provides the data as conditioned code values 50. In the simplest case, image processor 12 simply formats and passes original code values 40 as conditioned code values 50, without any modification of code value data. However, in conventional practice, some type of transformation is performed by image processor 12, so that conditioned code values 50 are not identical to original code values 40. From the perspective of LC spatial light modulator 10, an input code value received is termed a device input code value. Thus, conditioned code values 50, resulting from processing by image processor 12 according to the methods of the present invention, become the device input code values that are actually used to drive the LC spatial light modulator 10 hardware.

In the following description, the convention used is that a code value of 0 represents the black level (or, more precisely, the lowest possible luminance level) and that the maximum code value n represents the highest possible luminance level for LC spatial light modulator 10. With some devices, the reverse ordering is used, so that value n would provide the black level and 0 would provide maximum luminance. The same sequence of steps described herein below would apply for this reverse ordering, with the necessary changes, as would be apparent to those skilled in the imaging arts.

Figure 2:
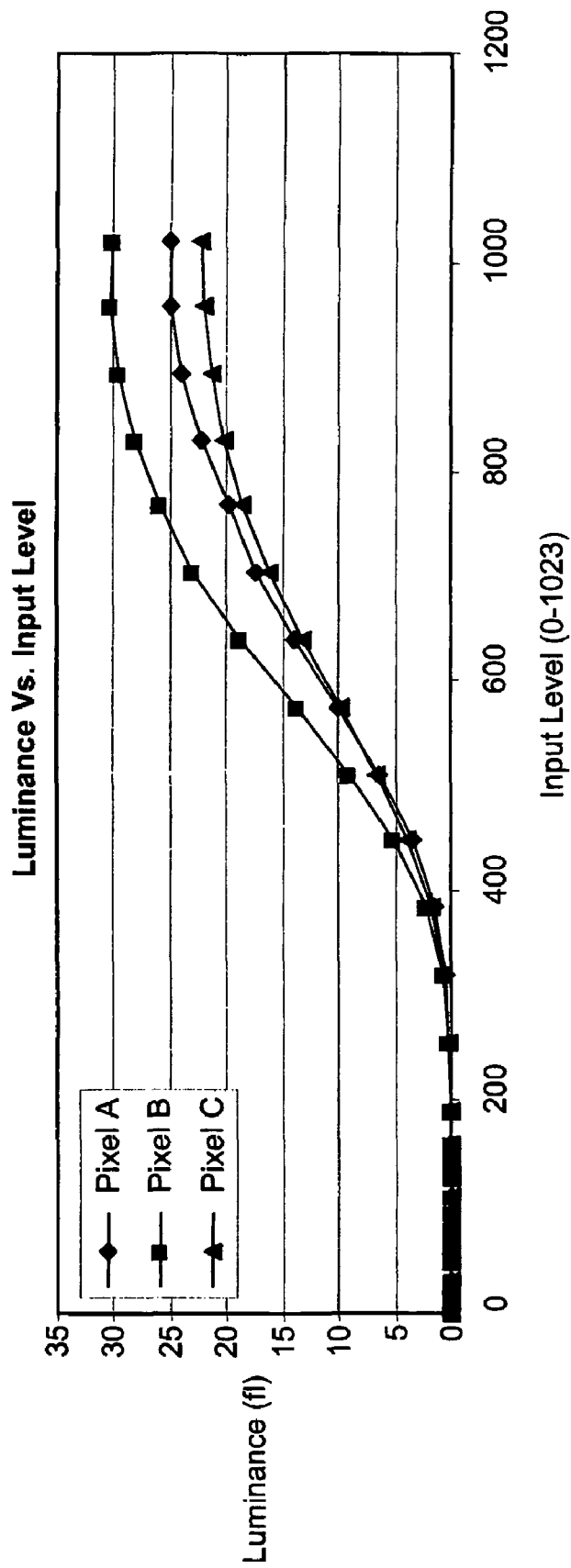
FIG. 2 is a graph of luminance versus code value for pixels on an LC spatial light modulator.

The graph of FIG. 2 shows characteristic luminance curves for representative sample pixels A, B, and C sampled from different portions of LC spatial light modulator 10, to a first approximation. As shown in this graph, sample pixels A, B, and C may respond with different luminance output when provided the same input level device code values. Without some method of compensation to correct for these differences in response, an image displayed on this LC display device would exhibit both luminance variation and color variation.

In terms of FIG. 1, unless image processor 12 modifies original code values 40 to provide conditioned code values 50 as device input code values, LC spatial light modulator 10 will not provide uniform luminance and color response.

In conventional practice, gray-level correction techniques are used to correct for non-uniform response as shown in FIG. 2. In FIG. 2 and in subsequent charts, the Input Level relates to code values provided directly to LC spatial light modulator 10, that is, to device input code values.

Gray-level correction techniques operate on averaged response over a number of different device input code value intervals. A subset of code values is selected in order to sample the brightness levels over the full range 0..n of LC spatial light modulator 10. For example, in a 10-bit resolution system where device input code values may range from 0 to 1023 (that is, where maximum value n=1023), input-output performance is characterized at a subset of possible device input code values, such as at 128, 192, 384, 576, 640, and 768. Then, for any specific device input code value, its proximity to a point in this subset determines the relative luminance correction level received. Standard approaches for calculating the amount of correction using gray-level correction techniques include the following:

1) Linear approximation. Gain and offset values for different ranges of device input code values are stored in memory and the input signal is modified based on a gain and offset calculation.
2) Quadratic approximation. Squared, gain, and offset values are stored for each range of device input code values, and a correction value is calculated using a quadratic formula.

While these standard approaches for gray-level correction work acceptably over most of the range of code values, however, these approaches do not apply equally well for input original code values 40 that correspond to the minimum or near-minimum luminance levels. This is due, in large part, to the non-linear response of LC spatial light modulators 10 at black and very low luminance levels, as described subsequently.

Black Level and Low-Luminance Level Response

Figure 3:
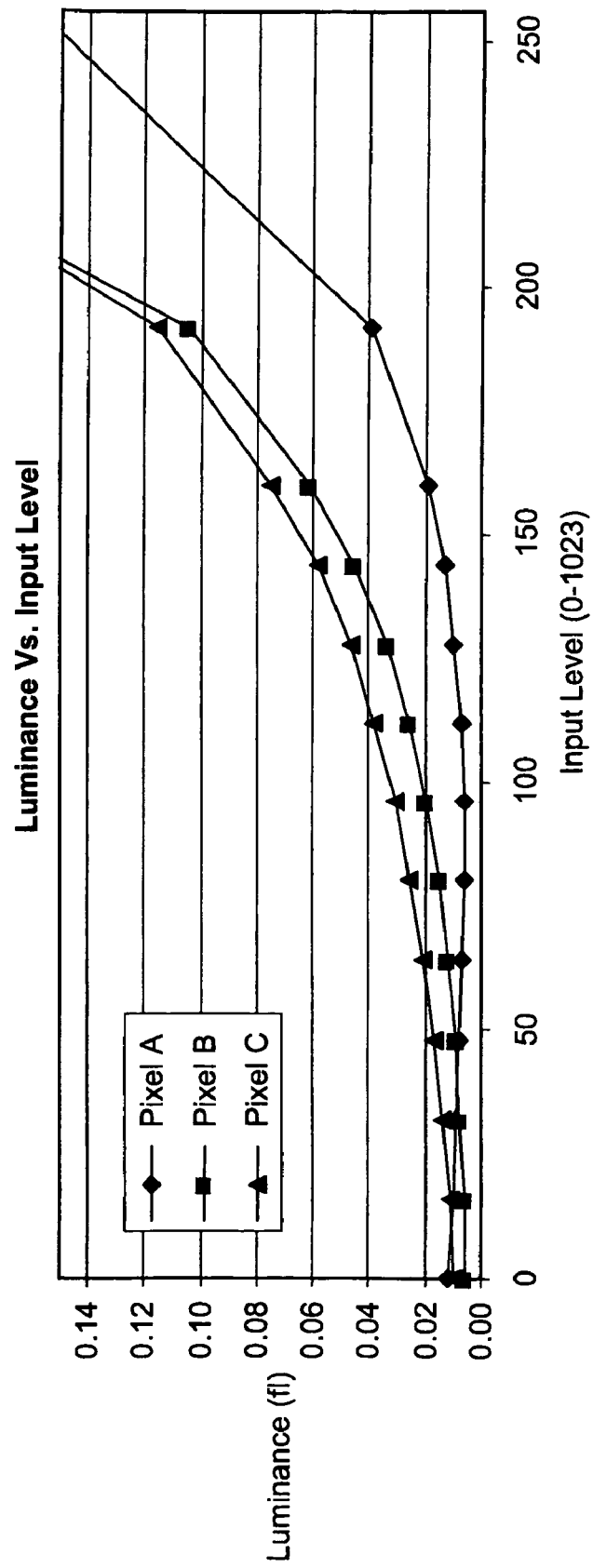
FIG. 3 is a graph of luminance versus code value for low luminance values.

Referring to the graph of FIG. 3, there is shown characteristic luminance response of sample pixels A, B, and C at low-luminance device input code values. The scale of FIG. 3 is magnified from that of FIG. 2 in order to show one common imaging anomaly for near-minimum luminance device input code values. Unlike the first approximation of FIG. 2, it can be observed that device response at low device input code values differs significantly for each of pixels A, B, and C. Luminance levels at minimum luminance device input code value 0 are not the same for these pixels. Nor are luminance levels generally equal over any range of values in the near-minimum luminance region. Pixel A even exhibits the undesirable behavior in which luminance at device input code value 0 actually exceeds luminance at higher device input code values. For example, a device input code value of 100 yields a lower luminance level than is exhibited at a device input code value of 0. As a result of this behavior, the gray-level correction techniques described above do not provide suitable correction at these black level and low luminance levels. Instead, some other type of correction must be implemented by image processor 12.

Due to the behavior shown and described with reference to FIG. 3, it would be difficult to apply any simple type of correction equally for each original code value 40, over its range from 0 to maximum, and for each pixel in LC spatial light modulator 10. Instead, the method of the present invention operates to correct for luminance non-uniformity by taking into account the different response behavior of each pixel in three parts:

(i) at code value 0 (that is, at black level or at the minimum luminance level);

(ii) at low luminance code values up to a threshold value; and, (iii) at higher luminance code values at and above the threshold value.

Correction at Minimum Luminance (Code Value 0)

Figure 4:
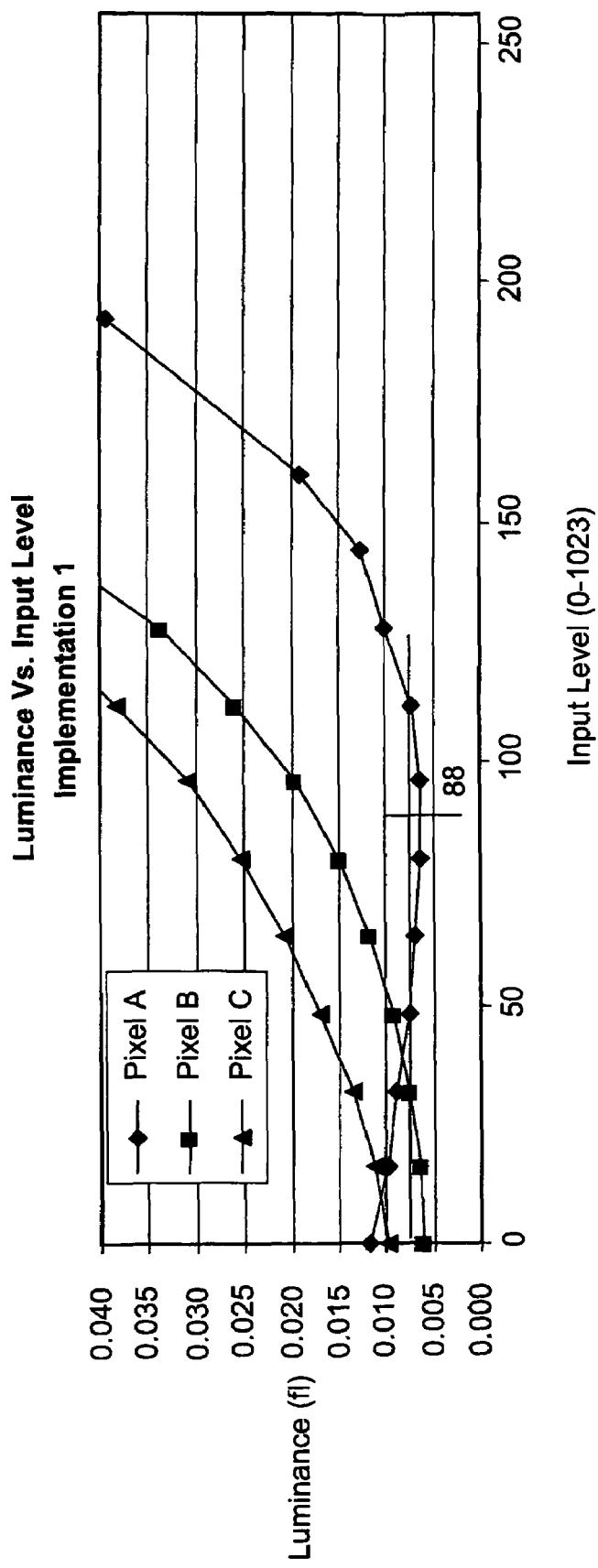
FIG. 4 is a graph of luminance versus code values for low luminance values showing how a minimum value can be derived using a first strategy.

The method of the present invention uses one of a number of strategies to provide correction for the code value of minimum luminance or black level, code value 0 using the convention described above. In a first strategy, the device input code value that provides the minimum luminance level for a pixel is assigned to the original code value of 0. As shown in the graph of FIG. 4, this assignment is straightforward for pixels B and C. For these pixels, device input code value 0 already provides the lowest luminance output. Luminance for pixels B and C then increases monotonically from code value 0. Thus, for pixels B and C, when original code value 40 is at black level (code value 0 using the convention of the present description), conditioned code value 50 is at code value 0. Since conditioned code value 50 is used as the device input code value, as was described with reference to FIG. 1, LC spatial light modulator 10 then provides its black level output for code value 0.

However, for pixel A from FIG. 4, the minimum luminance level is at a device input code value of 88. Pixel A exhibits monotonic luminance response only from this point forward. At device input code values of less than 88, higher luminance is exhibited by LC spatial light modulator 10. Applying this first strategy, then, a code value of 0 as original code value 40 in the input data for pixel A would be set to a conditioned value of 88 as its conditioned code value 50 by image processor 12 (FIG. 1). In summary, the following code value substitution for black level (black.offset) for code value 0 in the image data provided as original code value 40 would be as follows, given the response curves of FIG. 4:

| For Pixel, on LC spatial light modulator 10: | Given the following original code value 40: (where 0 = black level) | Image processor 12 provides the following as conditioned code value 50: |
|---|---|---|
| Pixel A | 0 | 88 |
| Pixel B | 0 | 0 |
| Pixel C | 0 | 0 |

This first strategy is advantageous for optimizing the contrast ratio of each pixel. However, uniform luminance over the display is not achieved at this black level. In addition, with a projection apparatus using multiple LC spatial light modulators, color uniformity can be compromised.

Figure 5:
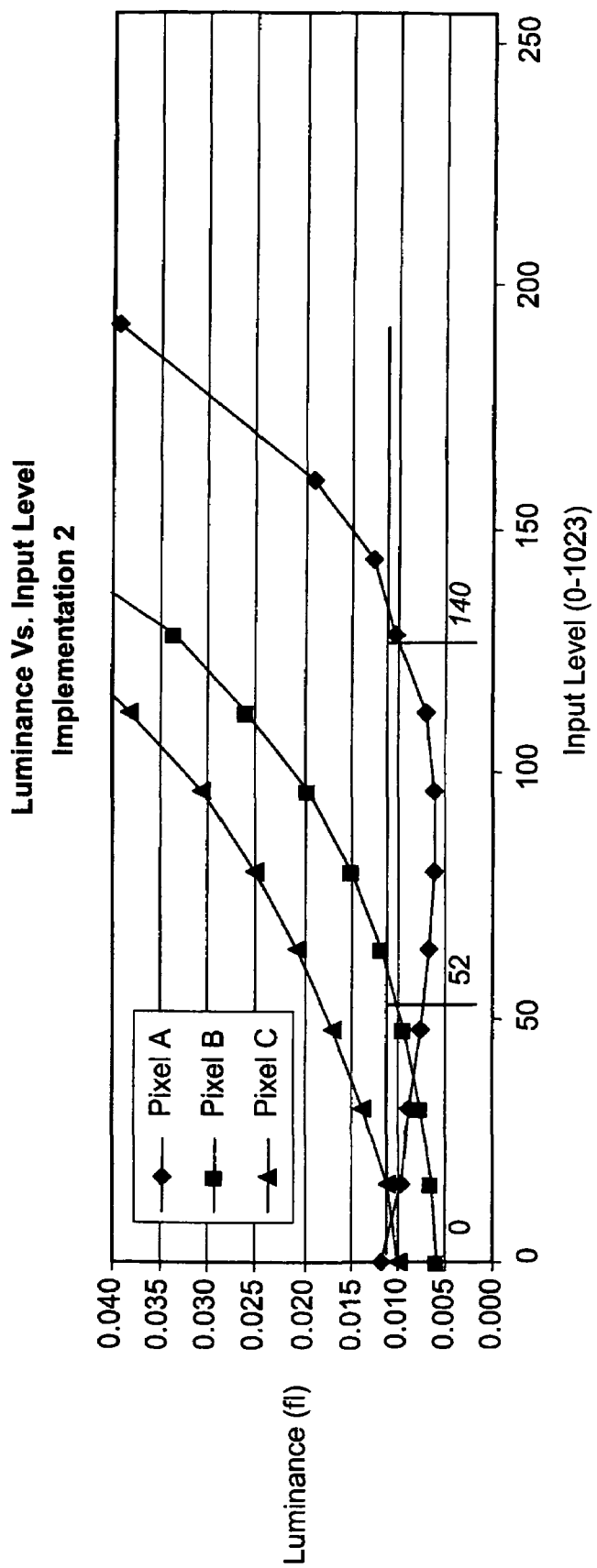
FIG. 5 is a graph of luminance versus code values for low luminance values showing how a minimum value can be derived using a second strategy.

In a second "greatest minimum luminance" strategy, the attempt is made to improve luminance uniformity. Referring to FIG. 5, it can be seen that pixels A, B, and C exhibit equal luminance at different device input code values. This strategy uses the device input code value that corresponds to the greatest minimum luminance of the set of pixels that have been characterized. Here, the greatest minimum luminance level is provided by pixel C, with luminance at approximately 0.01 fl. Given this value, the input levels for the other two pixels A and B, that is, the conditioned code values 50 needed for obtaining a black level for pixels A and B, are then set to provide the same luminance value. It is instructive to note that pixel A achieves this same value twice; in such a case, the second value at device input code value 140 is more desirable, since monotonically increasing response occurs at subsequently higher code values.

Applying this second strategy, then, the following code value substitution for black level (black.offset) for code value 0 in the image data provided as original code value 40 would be as follows, given the response curves of FIG. 5:

| For Pixel, on LC spatial light modulator 10: | Given the following original code value 40: (where 0 = black level) | Image processor 12 provides the following as conditioned code value 50: |
|---|---|---|
| Pixel A | 0 | 140 |
| Pixel B | 0 | 52 |
| Pixel C | 0 | 0 |

This second strategy is advantageous for improving luminance uniformity. However, in achieving this, there is some loss to contrast ratio. Color performance for a system using multiple LC spatial light modulators may be slightly improved with this second strategy.

Figure 6:
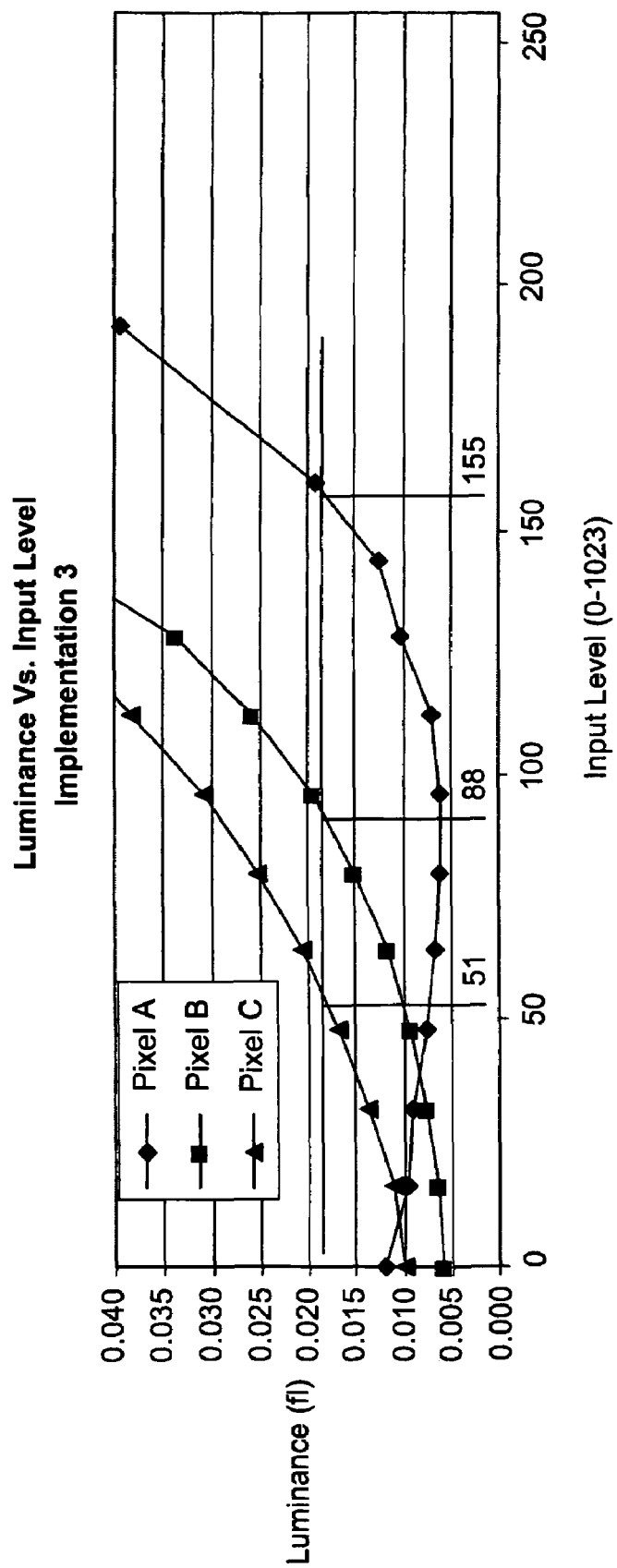
FIG. 6 is a graph of luminance versus code values for low luminance values showing how a minimum value can be derived using a third strategy.

In a third "common luminance" strategy, the attempt is made to improve both luminance uniformity and color. Referring to FIG. 6, a higher code value is assigned for code value 0, based on equivalent luminance of each pixel, where there is monotonically increasing response above the specified point. In this example, the desired output level has been chosen at 0.018 fl. From this common low luminance level forward, each luminance curve is monotonically increasing.

Applying this third strategy, then, the following code value substitution for black level (black.offset) for code value 0 in the image data provided as original code value 40 would be as follows, given the response curves of FIG. 6:

| For Pixel, on LC spatial light modulator 10: | Given the following original code value 40: (where 0 = black level) | Image processor 12 provides the following as conditioned code value 50: |
|---|---|---|
| Pixel A | 0 | 155 |
| Pixel B | 0 | 88 |
| Pixel C | 0 | 51 |

This third strategy is advantageous for improving luminance uniformity and color. However, because the effective black level that is used has some luminance level, contrast ratio can be compromised with this approach. Any of these three strategies could index a Look-Up Table (LUT) for transforming original code value 40 to conditioned code value 50.

In projection systems, industry standards are often set for displayed white point. These standards generally require a projector to meet a white point chromaticity target throughout the projector's brightness range. In this case, it is desirable to set the minimum luminance output of an LC device based on the color of the output it is controlling.

Correction from Code Value 1 to a Threshold Value

Once a black level has been assigned to code level 0, using any of the strategies described above, response over the next portion of the set of original code values 40 can be determined. As is shown in the curves of FIG. 3, there is typically some range of device input code values for low luminance over which the luminance vs. code value curve is not linear.

Figure 7:
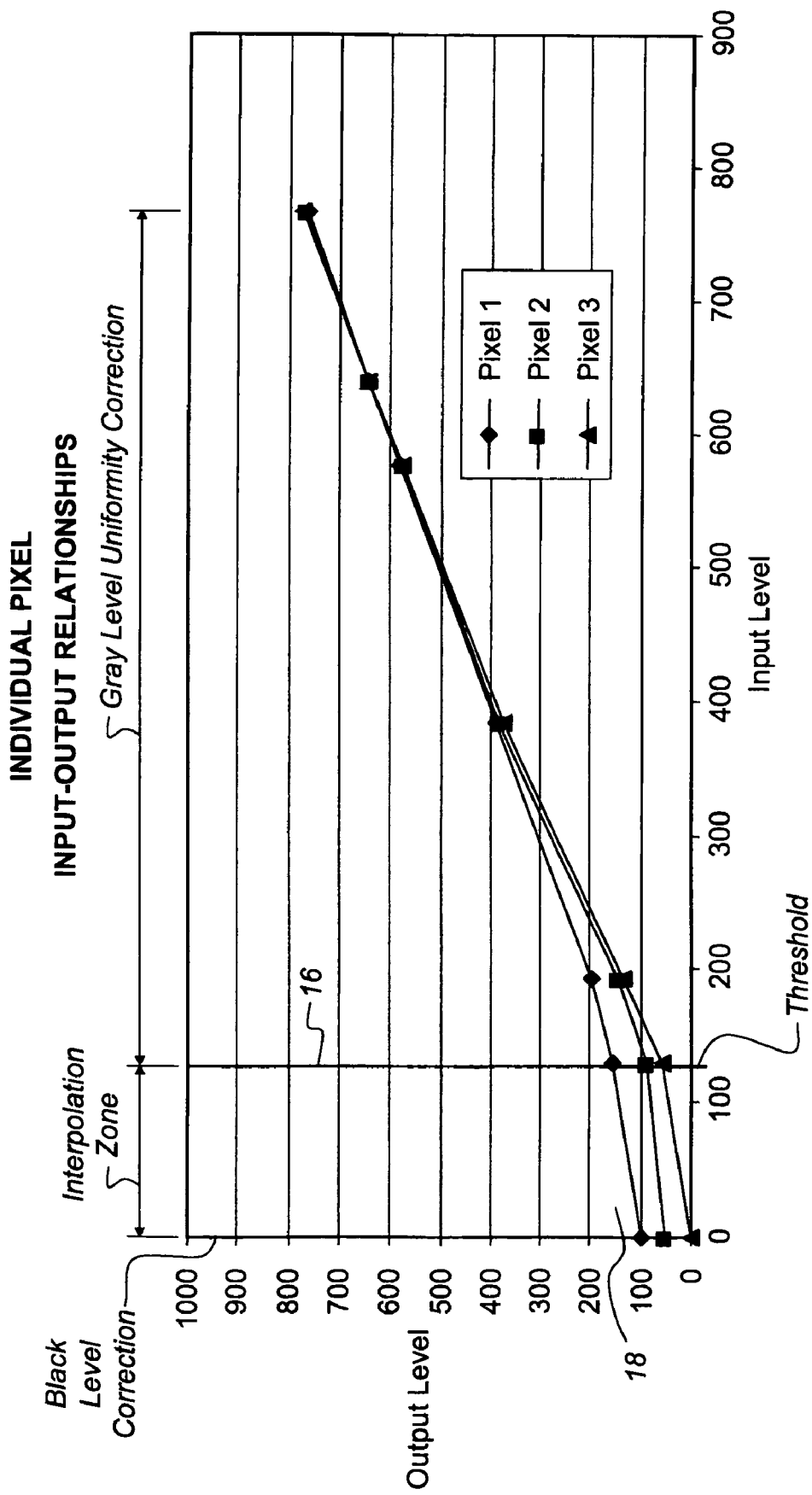
FIG. 7 is a graph of luminance versus code values showing the relative positions of interpolation zone and threshold values.

This range begins with the next code value from the minimum black level code value (a code value of 1 using the convention followed in this description) and extends to some threshold code value. In the graph of FIG. 7, this range between the next-to-minimum code value and a threshold value 16 is labeled an interpolation zone 18. To compensate for non-linear response over interpolation zone 18 and for code value adjustments needed to correct for non-monotonic curvature, an interpolation is used by image processor 12 for original code values 40 that fall within interpolation zone 18. In one embodiment, a linear interpolation is calculated between the minimum black level luminance value and threshold value 16. Linear interpolation uses a straightforward calculation, using the familiar formula:

$$x_1 = mx_0 + y. \quad (1)$$

wherein $x_1$ is the conditioned code value 50 assigned to the pixel, $x_0$ is the original code value 40 provided in the input data, m is the gain value, and y is the y-intercept value.

Other types of approximation techniques could alternately be used, such as using quadratic interpolation, for example.

Correction at Code Values Above the Threshold

As is shown in FIG. 7, code values above threshold value 16 are generally linear, allowing conventional gray-level correction techniques such as linear approximation to be used to adjust for non-uniformity. Linear correction as well as other correction techniques are well known to those skilled in the electronic imaging arts.

From the preceding description, it can be seen that any systematic attempt to correct for luminance uniformity must take into account pixel behavior over each portion of this response curve. Thus, for example, employing, over the full range of original code values 40, only those conventional gray-level correction techniques that are generally practiced may work acceptably over some range of luminance values. However, this often produces disappointing results over low-luminance pixels in a display image.

Correction at Code Value at the Threshold

Generally, it is desirable to avoid discontinuities in the output of an LC spatial light modulator. Therefore, in the method of the present invention, the correction for values below threshold value 16 and the correction for values above threshold value 16 are typically forced to be equal at the threshold. For example, if the above-threshold correction (gray-level correction) provides an output value of $x_{1\_gray\_threshold}$ at the threshold, then the gain m and offset y for the below-threshold (black-level) correction could be calculated as $$m = (x_{1\_gray\_threshold} - \text{black offset})/\text{threshold}$$

$$y = \text{black offset}$$

where black offset is the minimum luminance value or black level, as described above.

Steps for Black Level Uniformity Correction

Figure 8:
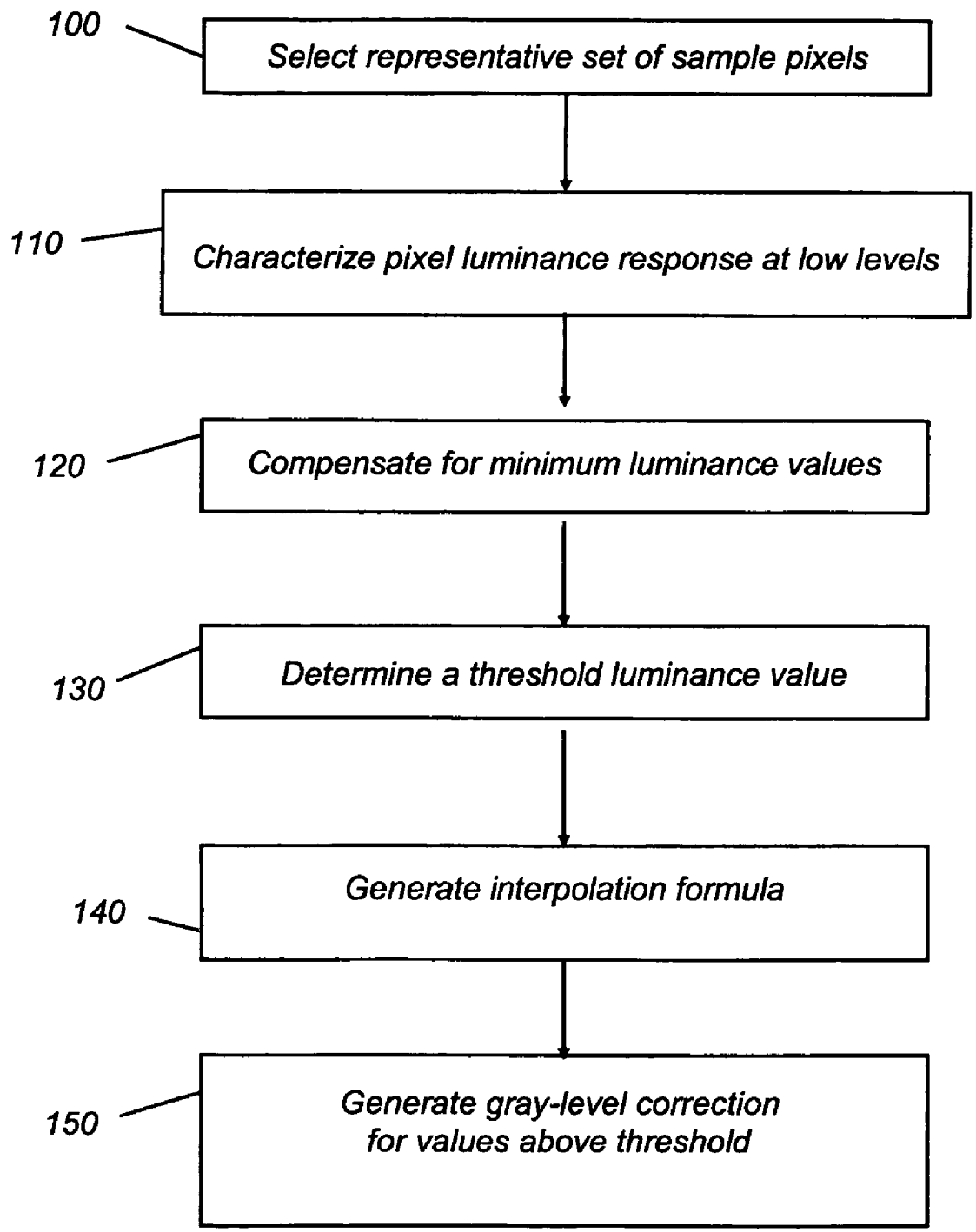
FIG. 8 is a flow diagram showing a sequence of steps for setting up uniformity correction for an LC spatial light modulator according to one embodiment of the present invention.

The variation in luminance response noted above serves as the basis for the method of the present invention. FIG. 8 shows a procedural flow diagram for following the overall method of the present invention. In a selection step 100, a representative set of sample pixels is specified for LC spatial light modulator 10. As was noted with respect to FIG. 1 and is described in more detail subsequently, pixels in different regions of LC spatial light modulator 10 exhibit different uniformity response. A representative sampling of pixels allows a small set of sample pixels to be used for calculation correction factors that can then be used for all pixels on LC spatial light modulator 10.

A characterization step 110 follows, during which the luminance response for each pixel in the set of pixels selected in selection step 100 is measured. This provides the data represented in the curves of FIGS. 2-7. In a compensation step 120, a compensation strategy for the minimum or black level luminance value is identified. This may be, for example, one of the three strategies described above. Following this, a threshold determination step 130 is executed. In threshold determination step 130, measured data from characterization step 110 is used to determine threshold value 16, the point on the luminance versus code value curve past which a generally linear relationship holds. Once threshold value 16 is determined, conventional gain-offset or other gray-level correction techniques can be applied for all higher luminance code values.

In an interpolation formula generation step 140, a suitable interpolation formula is developed for determining the luminance output at any code value in interpolation zone 18 (FIG. 7). Typically, linear interpolation is used; some form of interpolation that yields a monotonically increasing relationship of luminance levels to device input code values is best. Finally, a gray correction generation step 150 is executed, allowing the generation of a suitable calculation for gray correction for code values above the threshold value.

Given the procedure of FIG. 8, it is then possible to set up LUTs or algorithms to transform conditioned code values 50 to original code values 40. For each original code value $x_0$, a conditioned code value $x_1$ is obtained using a simple logic flow, as in the following pseudo-code:

If $x_0$=minimum luminance code value $x_1$=black.Offset else if ($x_0$<threshold)

$x_1$=interpolated.value else $x_1$=gray value.

where black.offset is the black level, determined for the minimum luminance value as described above. Value interpolated.value is obtained using interpolation formula generation step 140, as is also described above. Value gray value is obtained using the technique for conditioning input code values above the threshold. If linear interpolation is used then $x_1$ could be calculated as $x_1 = a_1 x_0 + b_1$. Here, value $a_1$ represents gain and value $b_1$ represents offset for conventional gray-level correction.

While the uniformity correction techniques of the present invention are applied to each pixel in the LC spatial light modulator, it would be prohibitive to measure the response of each individual pixel. Instead, as was described with respect to FIG. 1, a sampling is typically performed to obtain the representative set of sample pixels used in selection step 100. In one embodiment, where the LC spatial light modulator is arranged in 2048×1536 pixels, this total area is segmented into a number of 128×96 pixel regions. This arrangement advantageously gives a 16:1 ratio of display pixels to captured regions in both the width and height dimensions of the image. The underlying assumption is that the response of the display pixel at the center of each region, serving as the sample pixel, matches the response of the captured region. The response of the other pixels in the region are estimated from the response of the sample pixel in the region in which they fall and from the responses of the adjoining regions. This estimation is typically a two dimensional interpolation. Other segmentation methods could be used, depending on the resolution needed and overall uniformity of the LC device.

It is often desirable to set a single threshold value 16 (FIG. 7) for all pixels. In this case, threshold value 16 must be determined by evaluating the accuracy of the correction algorithm for all pixels. Based on the captured luminance and chromaticity response, the accuracy of the gray-level correction can be estimated for each pixel. The procedure below provides one method for determining threshold value 16 as value LC threshold:

(a) For all pixels or groups of pixels, set a test_threshold value to n−1, where n represents the maximum input value.
(b) Estimate if the gray-level correction will meet the desired accuracy of the output for each pixel or group of pixels. This accuracy is linked to an industry determined specification.
(c) Execute the following logic:
  If all pixels of groups of pixels meet the desired accuracy, reduce the test_threshold value by 1 and return to step (b).
  else
  LC threshold=test_threshold
  Done.

A similar procedure may be used to determine the threshold for each pixel or group of pixels, as follows:

(a) For all pixels or groups of pixels, set the test_threshold value to n−1, where n represents the maximum input value.
(b) Estimate if the gray-level correction will meet the desired accuracy of the output for each pixel or group of pixels. This accuracy is linked to an industry determined specification.
(c) For each pixel or group of pixels, execute the following logic:
  if the estimated output meets the desired accuracy,
  reduce the test_threshold value by 1 and return to step (b).
  else
  Set the threshold for the pixel or group of pixels=test_threshold.

Example Values

Figure 10:

The tables of FIGS. 9, 10, and 11 give example numerical values for pixels 1, 2, and 3 in the graph of FIG. 7, respectively. For each pixel, the black level correction value and threshold value 16 are identified, with equations used to obtain the actual values used according to the present invention.

Taking the example of FIG. 9, the black level code value is 100. With reference again to FIG. 1, this means that when original code value 40 is 0, indicating the minimum luminance level or black level, image processor 12 transforms this value to provide a conditioned code value 50 of 100. With reference to FIG. 7, threshold value 16 is set at 128. Interpolation zone 18, then, applies for original code values 40 ranging from 1 to 127. Image processor 12 transforms these values to provide conditioned code values 50 calculating, for this example:

Round(100+92*(145−100)/(128−0))

Thus, image processor 12 transforms an original code value 40 of 64 to provide a conditioned code value 50 equal to 123.

At threshold value 16 (equal to 128) and above, image processor 12 provides conditioned code values 50 by calculating:

Round(0.968(256)+21.517)

The example values and calculations shown in FIGS. 9, 10, and 11 are intended as illustrative only and are not to be considered as limiting. Following the basic pattern of the invention, after assigning values to black level and to threshold value 16, any of a number of suitable formulas could be used for calculating the transformation required for intermediate code values.

One characteristic of the present invention is that, when the input data specifies the minimum luminance value for a pixel, the device input code value for that pixel may not be the minimum device input code value or, more specifically, the lowest numerical device input code value. Thus, as the examples of FIGS. 9 and 10 show, an original code value 40 of 0 may not yield a conditioned code value 50 of 0. (Conversely, where the relationship of code value to luminance is the inverse and a maximum numerical code value is intended to correspond to the minimum luminance value, the present invention can transform the input code value data of original code value 40 so that it is other than this expected maximum numerical value.) This is in contrast to conventional transforms for code values with LC devices that automatically "fix" or "pin" the black level and the 100% luminance value and apply different formulas and approaches to transform the intermediate code values in order to achieve uniformity. That is, for LC spatial light modulator 10 that accepts device input code values ranging from 0 to n, the black level provided by image processor 12 according to the present invention may not be either 0 or n, but rather some other value. The present invention provides options for assigning some other value to the black level and for providing different treatment for pixels when lower luminance levels are required and where the characteristic response of the LC spatial light modulator is non-linear.

The invention has been described in detail with particular reference to certain preferred embodiments thereof, but it will be understood that variations and modifications can be effected within the scope of the invention. For example, while FIG. 1 shows control of a single LC spatial light modulator 10, the method of the present invention can be readily adapted to an apparatus that uses multiple spatial light modulators, such as one for each of the red, green, and blue primary colors, with their supporting light sources and other optical components, as would be familiar to those skilled in the electronic imaging arts. LC spatial light modulator 10 may be transmissive, as is shown in FIG. 1, or reflective, such as formed as an LCOS device, and would be supplied with the necessary supporting optics for light direction and uniformity. Thus, what is provided is a method for improving uniformity from an electronic display using a liquid crystal (LC) device.

| PARTS LIST | |
|---|---|
| 10 | LC spatial light modulator |
| 12 | image processor |
| 16 | threshold value |
| 18 | interpolation zone |
| 22 | light source |
| 26 | lens |
| 40 | original code value |
| 50 | conditioned code value |
| 60 | display apparatus |
| 100 | selection step |
| 110 | characterization step |

-continued

| PARTS LIST | |
|---|---|
| 120 | compensation step |
| 130 | threshold determination step |
| 140 | interpolation formula generation step |
| 150 | gray correction generation step |

The invention claimed is:

1. A method for improving uniformity from a liquid crystal spatial light modulator comprising:
   a) obtaining an original code value for a first pixel;
   b) assigning a conditioned code value to the first pixel according to the original code value, wherein the conditioned code value is determined by a process of:
      i) characterizing the luminance response of a sample pixel of the liquid crystal spatial light modulator;
      ii) defining an interpolation zone for code values bounded between a minimum luminance code value an a threshold code value for the sample pixel;
      wherein the threshold value corresponds to a luminance level at which, for higher code values, there is a generally linear relationship of luminance to code values;
      iii) assigning the code value at which the sample pixel yields minimum luminance from the spatial light modulator as the conditioned code value for the first pixel when the original code value is at its minimum luminance value; or
      calculating an interpolated value as the conditioned code value for the first pixel when the original code value lies within the interpolation zone; or
      applying a corrected gray-level value as the conditioned code value for the first pixel when the original code value is at or above the threshold code value; and
   c) modulating the first pixel of the spatial light modulator according to the conditioned code value.

2. The method of claim 1 wherein the sample pixel is one of a set of sample pixels, wherein each sample pixel in the set is representative of an area of the liquid crystal spatial light modulator.

3. The method of claim 1 wherein assigning the code value that yields minimum luminance comprises:
   a) measuring, from a set comprising a plurality of sample pixels, output luminance of the spatial light modulator over a range of device input code values; and
   b) designating, as the code value that yields minimum luminance, the device input code value at which the lowest luminance level common to the set of sample pixels is provided by the spatial light modulator.

4. A method for improving uniformity from a liquid crystal spatial light modulator comprising:
   a) obtaining an original code value for a first pixel;
   b) assigning a conditioned code value to the first pixel according to the original code value, wherein the conditioned code value is determined by a process of:
      i) characterizing the luminance response of at least one sample pixel of the liquid crystal spatial light modulator;
      ii) defining an interpolation zone for code values bounded between a minimum luminance code value and a threshold code value for the at least one sample pixel; wherein the threshold value corresponds to a luminance level at which, for higher code values, there is a generally linear relationship of luminance to code values;
      iii) assigning a minimum luminance code value by measuring, from a plurality of sample pixels, output luminance over a range of input code values to determine the lowest luminance level above which there is a monotonic relationship between code values and luminance and assigning the corresponding code value as the conditioned code value when the original code value is at its minimum luminance value; or
      calculating an interpolated value as the conditioned code value when the original code value lies within the interpolation zone; or
      applying a corrected gray-level value as the conditioned code value when the original code value is at or above the threshold code value; and
   c) modulating the first pixel of the spatial light modulator according to the conditioned code value.

5. A method according to claim 4 wherein the at least one sample pixel is representative of an area of the liquid crystal spatial light modulator.

6. A method for improving black-level response of a pixel of a liquid crystal spatial light modulator comprising:
   a) providing a plurality of device code values in a range from zero to a threshold code value to the spatial light modulator, wherein the threshold code value corresponds to a luminance level above which there is a generally linear relationship between luminance and device code values;
   b) measuring the luminance output of a sample pixel at a plurality of device code values within the range to determine at which device code value a minimum luminance is obtained, and assigning that device code value as a minimum luminance code value;
   c) transforming an original code value for the pixel to the minimum luminance code value when the original code value is zero; and
   d) calculating an interpolated code value for the pixel when the original code value lies within the range between zero and the threshold code value.

7. A method according to claim 6 wherein the step of calculating an interpolated code value comprises the step of indexing a look-up table.

8. A method for improving black-level response of a liquid crystal spatial light modulator in a multi-color system comprising:
   a) measuring the luminance output over a plurality of code values in a range from zero to a threshold code value for a set of sample pixels, wherein the threshold code value corresponds to a luminance level above which there is a generally linear relationship between luminance and device code values;
   b) determining the minimum luminance value obtained for each pixel in the set of sample pixels;
   c) determining a greatest minimum luminance value among the minimum luminance values determined for the pixels in the set of sample pixels; and
   d) setting the minimum luminance value for each pixel in the display to the greatest minimum luminance value obtained using the set of sample pixels, such that, for any input value in the display, the greatest minimum luminance value is the lowest luminance value provided for any input data code value.

9. A display apparatus comprising:
   a) an LC spatial light modulator that accepts a device input code value for each pixel in an array of pixels, and provides a corresponding level of luminance modulation for light from a light source, according to the device input code value, wherein the device input code value is from a range containing a minimum device input code value and a maximum device input code value; and b) an image processor that, for each pixel in the array of pixels, transforms an original input code value from the image data to a conditioned code value, and provides the conditioned code value as the device input code value to the LC spatial light modulator, whereby, for at least some number of pixels in an area of the LC spatial light modulator, an original input code value that specifies the minimum luminance for any pixel is transformed by the image processor to a device input code value that is other than either the minimum device input code value or the maximum device input code value.

\* \* \* \* \*